(12) United States Patent
Manning

(10) Patent No.: US 6,963,640 B1
(45) Date of Patent: Nov. 8, 2005

(54) MEMORY ARCHITECTURE FOR TELEPHONE DIALER

(75) Inventor: Frank B. Manning, Boston, MA (US)

(73) Assignee: Zoom Telephonics, Inc., Boston, MA (US)

( * ) Notice: Subject to any disclaimer, the term of this patent is extended or adjusted under 35 U.S.C. 154(b) by 0 days.

(21) Appl. No.: 09/557,570

(22) Filed: Apr. 25, 2000

Related U.S. Application Data (60) Provisional application No. 60/133,572, filed on May 11, 1999.

(51) Int. Cl.[7] .................. H04M 1/00; H04M 3/00; H04B 1/38
(52) U.S. Cl. .................. 379/355.08; 379/355.01; 379/355.03; 379/355.02; 455/564
(58) Field of Search .................. 379/355.01, 355.02, 379/355.03, 355.05, 355.08, 355.09, 355.07; 455/564, 565

(56) References Cited

U.S. PATENT DOCUMENTS

| | | | | |
|---|---|---|---|---|
| 5,182,766 A | * | 1/1993 | Garland .................. | 379/216.01 |
| 5,588,049 A | * | 12/1996 | Detering et al. ........ | 379/142.04 |
| 5,710,808 A | * | 1/1998 | Eaton .................. | 379/200 |
| 5,722,088 A | * | 2/1998 | Storn et al. .................. | 455/564 |
| 5,754,636 A | * | 5/1998 | Bayless et al. ........ | 379/142.01 |
| 5,887,058 A | * | 3/1999 | Kammath et al. .......... | 379/284 |
| 5,946,390 A | * | 8/1999 | Boakes .................. | 379/355.01 |
| 5,963,876 A | * | 10/1999 | Manssen et al. ............. | 455/564 |
| 6,137,877 A | * | 10/2000 | Robin et al. ................. | 379/352 |
| 6,360,108 B1 | * | 3/2002 | Rogers ........................ | 455/564 |
| 6,408,067 B1 | * | 6/2002 | Robinson ............... | 379/355.08 |
| 6,449,497 B1 | * | 9/2002 | Kirbas et al. ............... | 455/564 |
| 6,597,785 B1 | * | 7/2003 | Burke et al. ........... | 379/355.08 |
| 6,751,311 B1 | * | 6/2004 | Arnold et al. ......... | 379/355.08 |

* cited by examiner

*Primary Examiner*—Rexford Barnie
(74) *Attorney, Agent, or Firm*—Hamilton, Brook, Smith & Reynolds, P.C.

(57) ABSTRACT

A telephone dialer includes tables in memory for determining a dialing sequence such as a long distance carrier code to be appended to a dialed telephone number. A variable length prefix portion of the dialed telephone number accesses a prefix table entry that defines an action descriptor for indicating how the telephone number should be processed in a table lookup to determine the dialing sequence. The action descriptor includes a specification of the number of digits to be dialed to trigger a dialing action and may include an indication of an elapsed time to trigger dialing. The action descriptor also includes an indication of the number of digits after the prefix used to determine an action and may specify one of plural ways in which those digits are used to determine the action. The action descriptor also identifies a pointer table to be indexed by the specified digits of the telephone number. The entry in the pointer table points to an entry in the long distance table associated with a particular long distance carrier. The entry in the long distance table then specifies the dialing sequence. The tables may be reprogrammed over telephone lines using DTMF signals or a modem.

50 Claims, 6 Drawing Sheets

| PREFIX | F | DIGITS TO DIAL (DTD) | TABLE DESCRIPTOR TD=1,2 OR 3 | POINTER TABLE START ADDRESS |
|---|---|---|---|---|

| PREFIX | F | DIGITS TO DIAL (DTD) | TABLE DESCRIPTOR TD=4 | M | START ADDRESS | END ADDR. |
|---|---|---|---|---|---|---|

| PREFIX | F | DIGITS TO DIAL (DTD) | TABLE DESCRIPTOR TD=1,2 OR 3 | POINTER TABLE START ADDRESS |

FIG. 4A

| PREFIX | F | DIGITS TO DIAL (DTD) | TABLE DESCRIPTOR TD=4 | M | START ADDRESS | END ADDR. |

MEMORY ARCHITECTURE FOR TELEPHONE DIALER

RELATED APPLICATION(S)

This application claims the benefit of U.S. Provisional Application No. 60/133,572 filed May 11, 1999, the entire teachings of which are incorporated herein by reference.

BACKGROUND OF THE INVENTION

Figure 1A:
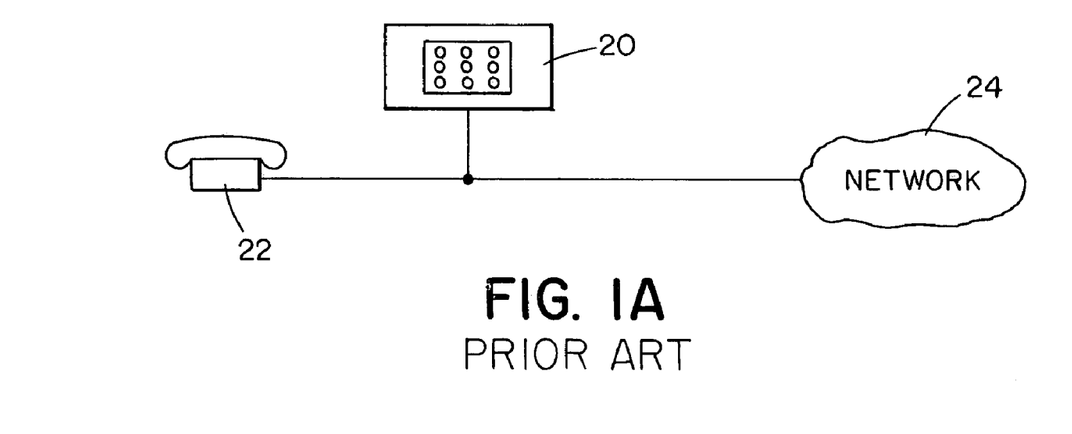
FIGS. 1A, B and C illustrate prior art dialers to which the present invention can be applied.
Figure 1B:
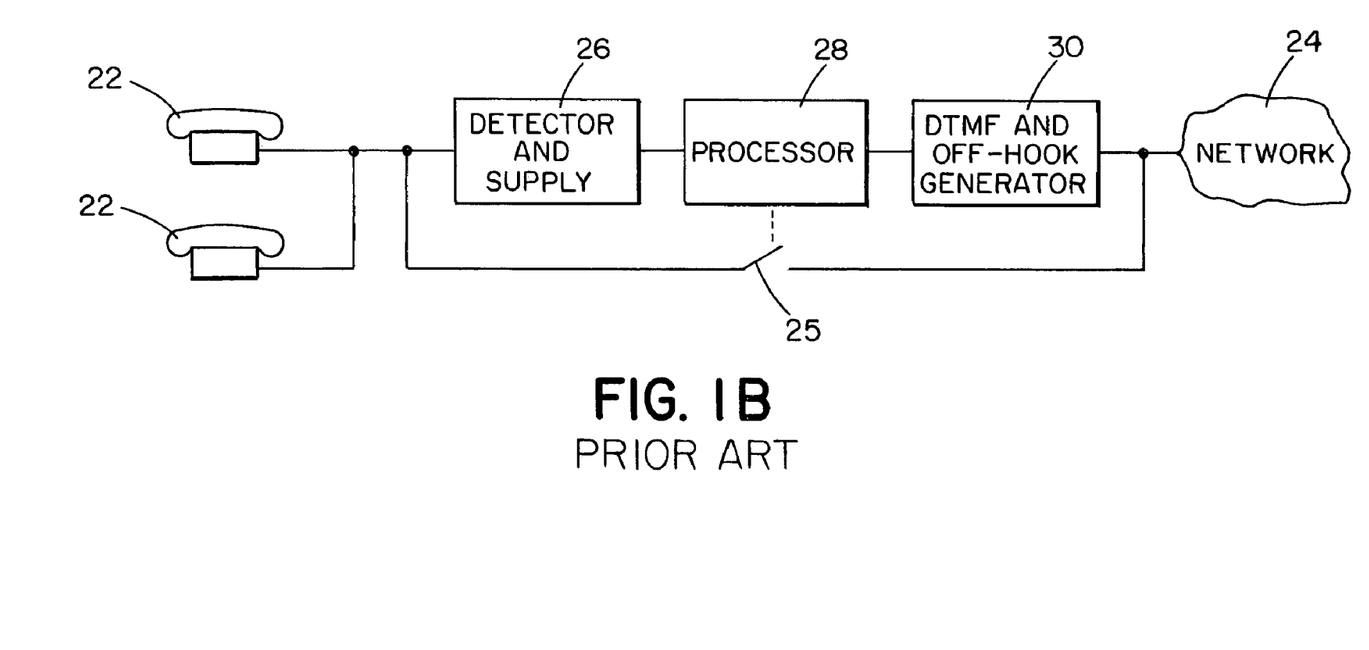
Figure 1C:
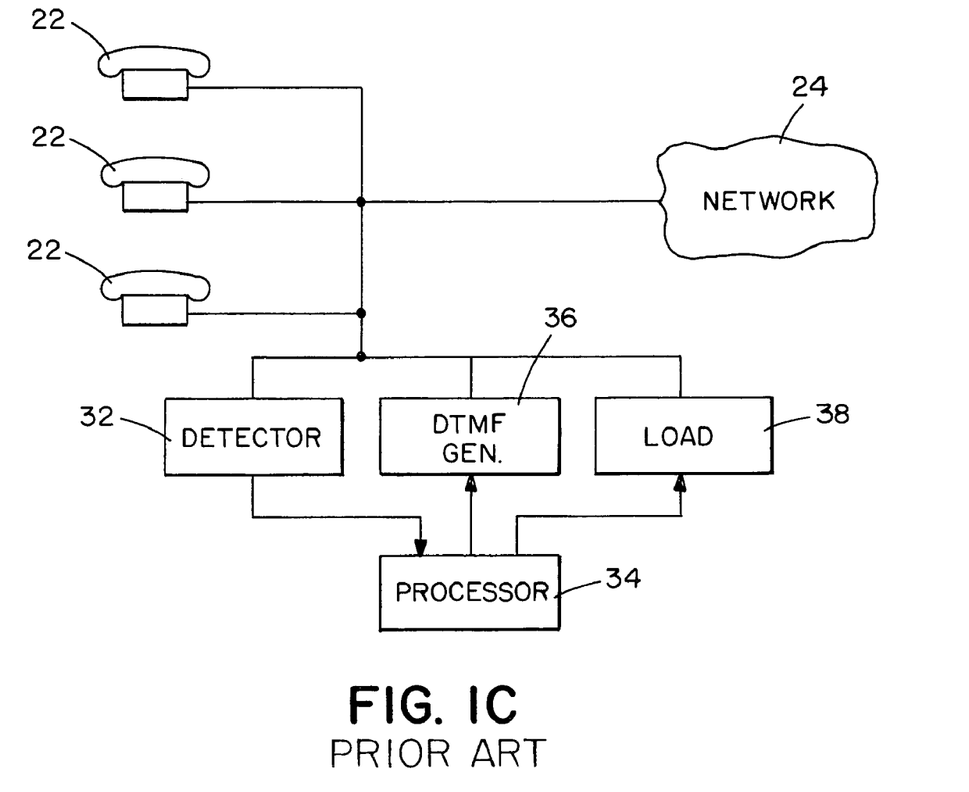

Telephone dialers have been used to simplify dialing operations or to allow for more economic use of carrier options. Three examples of telephone dialers are illustrated in FIGS. 1A–C. In FIG. 1A, a dialer 20 is coupled in parallel with a telephone 22. The dialer 20 includes a keypad which enables a user to program dialing sequences to be applied to the telephone network 24 when the user enters some short code on the keypad. For example, to place a call, the user may take the handset off hook, apply a three digit code to the keypad of dialer 20, and wait for the dialer to generate a full dialing sequence to complete the call to the network. Series dialers are coupled between one or more telephones and the network, as illustrated in FIG. 1B. The user takes the handset off hook and dials a sequence through the telephone keypad. Some DTMF digits may not be sent to the telephone network; and in that case the relay 25 is open. The series dialer detects the code input by the user through a DTMF and off-hook detector 26 that supplies power to the telephones when they are not connected to the network, processes that code to select a dialing sequence, if any, and when appropriate applies that sequence to the network through a DTMF and off-hook generator 30. The processor 28 may then open the direct connection from the handset 22 to the network. Parallel dialers such as illustrated in FIG. 1C can be anywhere on a line in parallel with many telephones. An example of such a parallel dialer is presented in U.S. Pat. No. 5,898,756. In that system, the user enters a code on the handset keypad as with the series dialer, and that code is detected through a DTMF, off-hook and ring detector 32 and processed by a processor 34. The processor generates the dialing sequence and applies it to the network through a DTMF generator 36. Because the telephones 22 are coupled directly to the network, the processor 34 applies an AC load 38 to the line while the codes are entered into the telephone in order to prevent the network from responding directly to those codes. The load is then removed to enable the appropriate dialing sequence to be applied to the network and to allow for voice and data communications thereafter.

An advanced function of dialers is to store a dialed sequence before it is forwarded on to the network and to determine from the sequence a preferred long distance carrier. To direct the call to that carrier, an additional sequence is prepended to the dialed numbers. For example, in the United States, a domestic long distance call is initiated by a user dialing a prefix of 1 followed by the area code, an exchange typically associated with a local telephone switching center and a four digit subscriber number. The user can at the time of dialing designate a long distance carrier to handle the call. To that end, the call sequence is typically prefixed by 1010, rather than 1, followed by a number associated with the long distance carrier, followed by the area code, exchange and subscriber number. A dialer may store a dialed number, process the number to determine an appropriate long distance carrier and insert the 1010 and carrier code into the sequence before forwarding it to the telephone network through a DTMF generator. Similarly, an international long distance call is typically initiated by a user dialing a prefix of 011 followed by the country code, city code and the desired party's domestic phone number. A dialer may select an appropriate carrier and insert the appropriate dialing sequence depending, for example, on the country to which the call is directed. For example, a carrier known to have the best rates to a particular destination at a particular time can be selected.

Thus, it is advantageous for a dialer's behavior to be governed by a prefix of the dialed phone number, such as 1 or 011, and perhaps additional digits following the prefix such as an area code. Sometimes a very short prefix may determine behavior, such as an 0 followed by a digit other than 0 or 1. Other times a very long sequence may determine behavior, such as 1 followed by the area code followed by the 3 digit local exchange or 011 followed by a country code that typically varies from 1 to 3 digits. Thus it is advantageous to respond to sequences that vary in length. A fast and easy way to deal with these variable length sequences is to form a memory address for all possible combinations of numbers formed by the maximum number of digits (0000000 through 9999999 for 7 digits, for instance), and to store in each address the routing information to be generated, such as "1010345." This simple approach has the disadvantage of consuming very large amounts of memory. Another disadvantage is that loading this large memory one location at a time would be very time-consuming.

SUMMARY OF THE INVENTION

The invention described below can be applied to any dialer which has a source of dialed digits, such as a keypad or received DTMF digits, and an ability to dial digits (typically DTMF, but also rotary) to place a phone call. The dialer can be part of a cordless or corded phone, a special purpose dialer with a keypad, or a parallel or series dialer that looks at dialed DTMF digits.

In accordance with the present invention, a prefix table entry is accessed using a variable length prefix portion of a telephone number. The prefix table entry defines an action descriptor which indicates how the telephone number should be processed in a table lookup to determine a dialing sequence. A dialing sequence which is generated is based on the original telephone number and a prefix table entry.

Prefix portions accessed in the prefix table may be definable to include variable digits. Those variable digits may serve as "wild cards" in defining a prefix. Each prefix in the table may be separated from an action descriptor by a punctuation code.

A prefix may include an indication of elapsed time to indicate completion of the prefix. This feature is used for a leading 0 to reach an operator, for instance. If someone dials 0 and delays a specified time, such as 3 seconds, the dialer dials a 0. If the person dials 0 followed promptly by 11, then the dialer waits for the rest of the international call.

An action descriptor of the prefix table entry may include a specification of a minimum number of digits to be dialed to trigger a dialing action. Further, an indication of an elapsed time to trigger dialing may be provided.

An action descriptor may include an indication of the number of digits after the prefix used to determine an action. For instance, after the prefix 1, the next 3 digits (the area code) may determine the action. After the prefix 011, the next 1 to 3 digits may determine the action.

The action descriptor may specify one of plural ways in which the digits after the prefix are used to determine an action. For example, the digits after the prefix may address a table which identifies a dialing action, and the action descriptor may further include a table identifier. The digits after the prefix may also be matched with an entry in a table to identify a dialing action.

In a specific embodiment, information is retrieved from the prefix table entry to indicate a number of digits of the dialed number to be used to search a long distance pointer table. A starting address of the long distance pointer table is also retrieved from the prefix table entry. The long distance pointer table is searched to determine a pointer to a long distance carrier, and the long distance carrier pointer is used to access a long distance carrier code from a long distance table. For example, the long distance table may contains dialing details for each long distance code such as "dial 1010345" or "dial 4230033, listen for a computer tone, then dial 444444, then dial the long-distance number dialed by the user."

An entry in the long distance table may also include a predial code to determine from additional digits of the telephone number whether the dialing sequence of the long distance table is used or the original telephone number is passed through. The predial code may cause an extension of the telephone number to address a predial table.

The tables may be reprogrammed to define the prefix table entries and action descriptors. The tables may be reprogrammed through DTMF signals from a remote computer at a central office, through a modem connected to the remote computer or from a local computer or other programming machine, either tied directly to the dialer or communicating with it through the phone line.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 2:
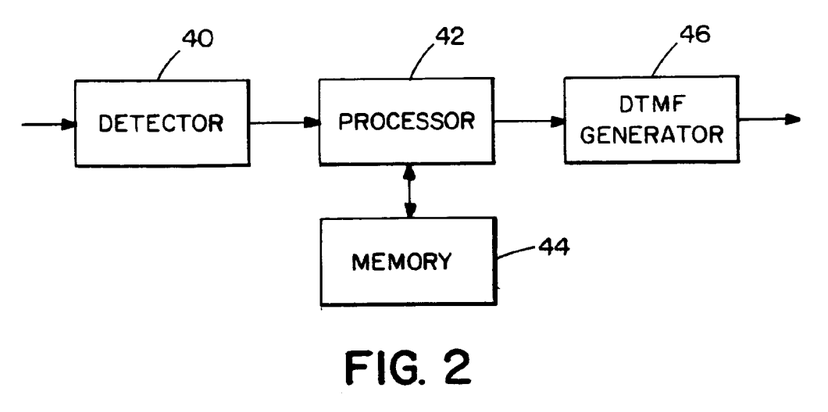
FIG. 2 presents a block diagram of a dialer to which the invention may be applied.

As noted above, the present invention can be applied to many forms of dialer, but it is described relative to either a series or a parallel dialer which responds to DTMF tones and generates DTMF tones to be applied as a dialing sequence. As illustrated in FIG. 2, a DTMF and off-hook detector 40 is coupled to the system, as illustrated in either FIG. 1B or 1C, to detect DTMF tones generated at a handset or other dialing source. The processor 42 stores the digits obtained from those DTMF tones and consults a routing table architecture stored in memory 44 to determine an appropriate dialing sequence. For example, the processor may replace the dialed digit 1 in a dialing sequence with an extended prefix by which a particular telephone carrier is requested and then append the remainder of the originally dialed sequence to define a complete sequence of digits. That sequence is then converted to DTMF tones through generator 46.

Figure 3:
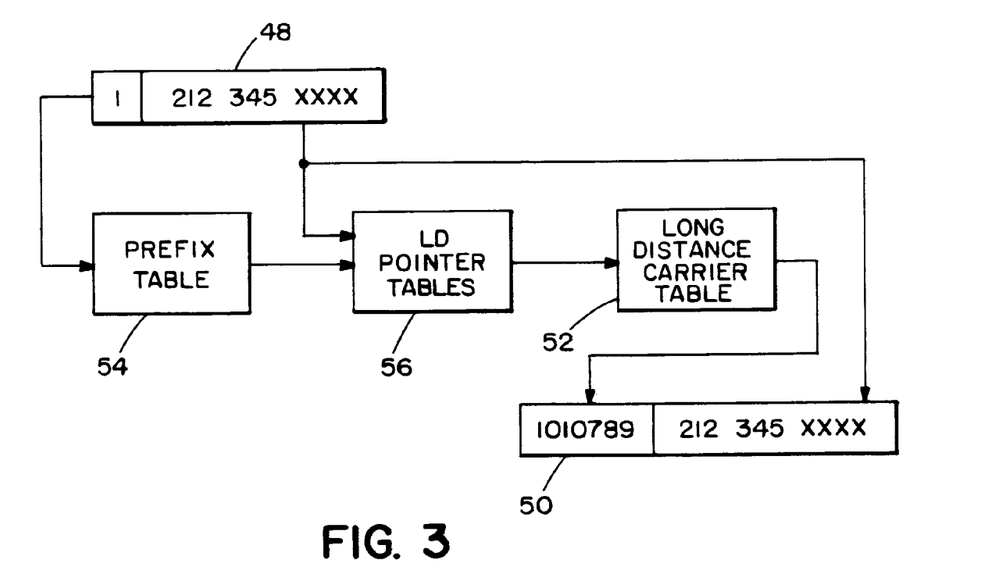
FIG. 3 is a block diagram illustrating routing tables embodying the present invention.

For example, as illustrated in FIG. 3, the user initially dials the number 1 212 345 xxxx. Based on that sequence, the system selects an appropriate long distance carrier and that carrier has associated with it a sequence 1010789 which replaces the prefix 1 in the final dialing sequence 50.

Each long distance carrier has its own sequence which is stored in a long distance carrier table 52. For example, the system may recognize 15 carriers, and the long distance carrier table 52 would have 15 entries, each including a sequence to be prepended to the generated dialing sequence.

Any number of rules may be relied upon to select a particular entry in the long distance carrier table 52. Those rules initially depend on a prefix of varying length such as the prefix 1 for a long distance call within the U.S. or the prefix 011 for an international call. Further, depending on the prefix, a variable number of additional digits dialed by the user may dictate the most appropriate selection of a long distance carrier. For example, depending on the area code into which a call is made, a different carrier may provide better pricing. Similarly, different carriers may be more appropriate for calls to different countries. Even within an area code, the best choice of a carrier may depend on a local exchange.

Appropriate selection of a carrier is also dependent on the location of the dialing device. Thus, a set of rules appropriate for selection of a carrier when dialing from one city would not be appropriate for selection of a carrier from another city.

One prior approach to handling proper routing of calls to appropriate carriers has been to create routing tables at a central processing center and to download individual routing tables to programmable dialers. However, those dialers have required large amounts of memory space in order to account for all of the various possibilities of dialing sequences. This is a major disadvantage when cost is involved, due to the cost of the memory and the time and expense of loading the memory from a distant location. The memory cost is particularly troublesome if the memory needs to be non-volatile and changeable, such as an NVRAM. Thus, it is desirable to handle variable length prefixes and sequences that may be short or long in less memory space.

Another problem is in determining when to dial. This is not particularly troublesome when a manual keypad is used, since the keypad is not coupled directly to the phoneline. It is a significant problem for a parallel dialer where the same phoneline is used for entering digits to the dialer and for relaying digits from the dialer to the central phone office. Thus, dialers may need a way for the dialer to know when to dial.

The present invention provides for economic use of memory space in a dialer routing table by permitting any number of rules to be established in a prefix table 54. Those rules may define the prefix itself and the digits of the sequence to be considered in determining an appropriate long distance carrier. The rule may also identify a particular table, one of plural long distance (LD) pointer tables 56, through which a particular carrier is identified from a particular set of digits in the dialed sequence. Finally, the rules provided in the prefix table may identify completion of the input dialing sequence so that the output sequence can then be generated.

Although not illustrated, the dialer may include additional tables stored in memory. For example, a global table may include a dialer serial number, dialer phone number, particular dialing requirements of a particular line in which the dialer is placed, and particular instructions for updating the routing program.

Addresses to the tables are presented in hexadecimal digits (16 possible values per digit) unless otherwise indicated. A hexadecimal digit is defined by a nibble of four bits.

Figure 4A:
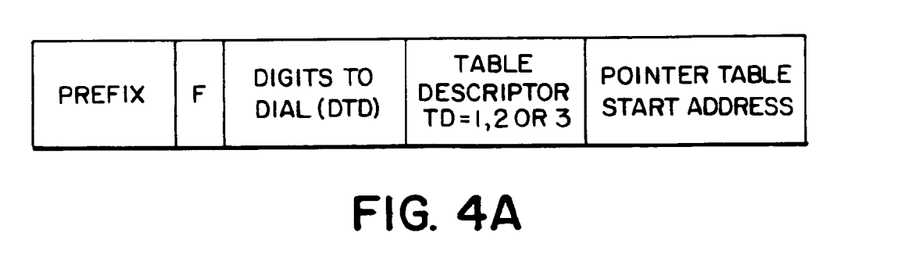
FIGS. 4A and B illustrate entries in the prefix table of FIG. 3.
Figure 4B:
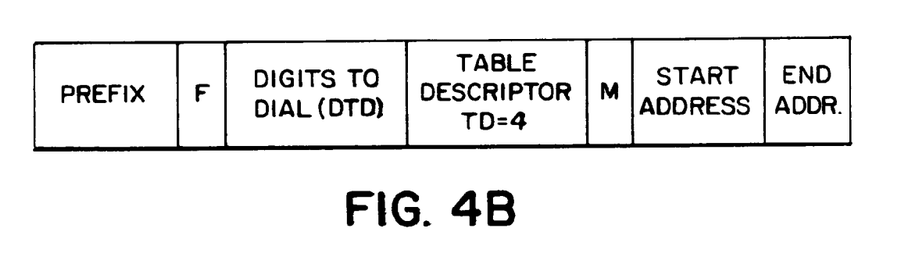

FIGS. 4A and 4B illustrate the data structure of each entry of the prefix table. Each entry begins with a prefix such as 1 or 011. To allow for variable length prefixes not limited by field length, the end of each prefix is indicated by the punctuation mark F. The database manager has complete flexibility in defining prefixes. For example, a prefix may extend beyond the international prefix of 011 to include a particular country code. When a dialed telephone number is received, the processor compares each of the prefixes in the prefix table to the initial digits of the dialed number to locate a match. If no match is found, the dialed number is passed through as a final dialing sequence without modification.

In addition to being definable by any number of the 12 dialable digits, prefixes in the table are also defined by the nondialable digits C, D and E. The digit C represents the telco X which is any digit from 0 through 9. The digit D represents the telco N which is any digit from 2 through 9. The digit E represents an elapsed time without dialing, the elapsed time being specified in the nibble following the digit E. This digit is used for a leading 0 to reach an operator in the prefix OE, for example. When this command is encountered, the dialer should consider this to be the last command for this prefix table entry.

In matching a prefix, a match on a string without wildcard characters C or D has priority over a match on a string with wildcard characters included. The prefix match priority is as follows:

A. All non-wildcard prefixed characters precede wildcard characters.

B. Prefix strings which have no wildcards and share a common root are according to length. The longer 123456 comes before 123.

C. Prefix strings which have no wildcards are placed in ascending hexadecimal numeric order, digit by digit, starting with the first, or leftmost, digit.

D. Candidates which have the same length but wild cards at different positions are ordered according to which wildcard appears latest. Thus, 12C45C comes before 1C345C.

Immediately following the punctuation mark F is a nibble called Digits-To-Dial (DTD) that says, for that prefix, how many digits need to be dialed by the person after the prefix to complete the sequence and before which the dialer will dial. 0 means "pass through the dialed number as soon as the prefix is dialed." F is not allowed. An E in the DTD field means "after the number of digits specified in the nibble following the E are dialed after the prefix, do not dial immediately but do dial as soon as two seconds go by without the person dialing." E is useful for international calls which have a variable number of digits.

Following the DTD digit or digits is a table descriptor (TD) which indicates one of four types of LD pointer tables 56 which may dictate the selection of the long distance carrier. The particular LD pointer table to be accessed is identified by the following digits.

A table descriptor code of 1, 2 or 3 indicates a prefix table entry structure of FIG. 4A. The table descriptor code is followed by a 3-nibble Start-address which points to the start address of an LD pointer table. The Start-address specifies an offset from a fixed location in memory (possibly location 0). In the case of a table descriptor code of 1, the system uses the first digit dialed by the person after the prefix to access a one-nibble entry of a ten entry LD-pointer table starting at the Start-address. Each of these nibbles is either F (indicating passthrough of the dialed sequence) or one of 15 addresses 0 through E into the LD-table 52 to show how to route the call.

In the case of a table descriptor code of 2, the system uses the first two digits dialed by the person after the prefix to access a 100-nibble LD-pointer table starting at Start-address. With a table descriptor value of 3, the system uses the first three digits dialed by the person after the prefix to access a 1000-nibble LD-pointer table starting at Start-address.

In some instances, such as in a country code, either the next two digits or the next three digits may be determinative. In that case, a code of three could be used with multiple entries for each two digit code. For example, the LD pointer for the country code 44 would be included in the table at each of the addresses 440 through 449.

A table descriptor code of 4 indicates a prefix table entry structure of FIG. 4B. The table descriptor code is followed by a nibble M, a 3-nibble Start-address and a 3-nibble End-address. M determines how many digits after the prefix should be used to try to match one of the entries in a Compact Long Distance (CLD) Table 56 starting at Start-address. If the Prefix Table entry indicates a value of M as 3, for instance, the LCD Table has a number of entries packed together, with each entry being a candidate 3-nibble string to compare to the user's string, plus an ensuing nibble to specify the Long-distance Table index should there be a match. Wildcards X and N may be included as the final digit(s) for cases where less than M digits control. For example, if the compact table is used for country codes, which vary in length of two or three digits, two digit codes would be followed by a wildcard. The "addresses" or candidate nibble strings in this table should be in numeric order based on the first digit, then the second digit, etc., to minimize search time.

An example use of a compact table would be to include a particular country code in a prefix and to include city codes in a compact table.

Each entry in the Prefix-table is allocated 16 nibbles. If a command is not over after 16 nibbles have been processed, it can wrap to the next location. (This would only be true if trapping a long phone number.) If a location begins with the nibbles FF, it is empty and there are no more P-table entries. If a location begins with the nibbles FE, it is a continuation of the prior P-table entry.

Figure 5:
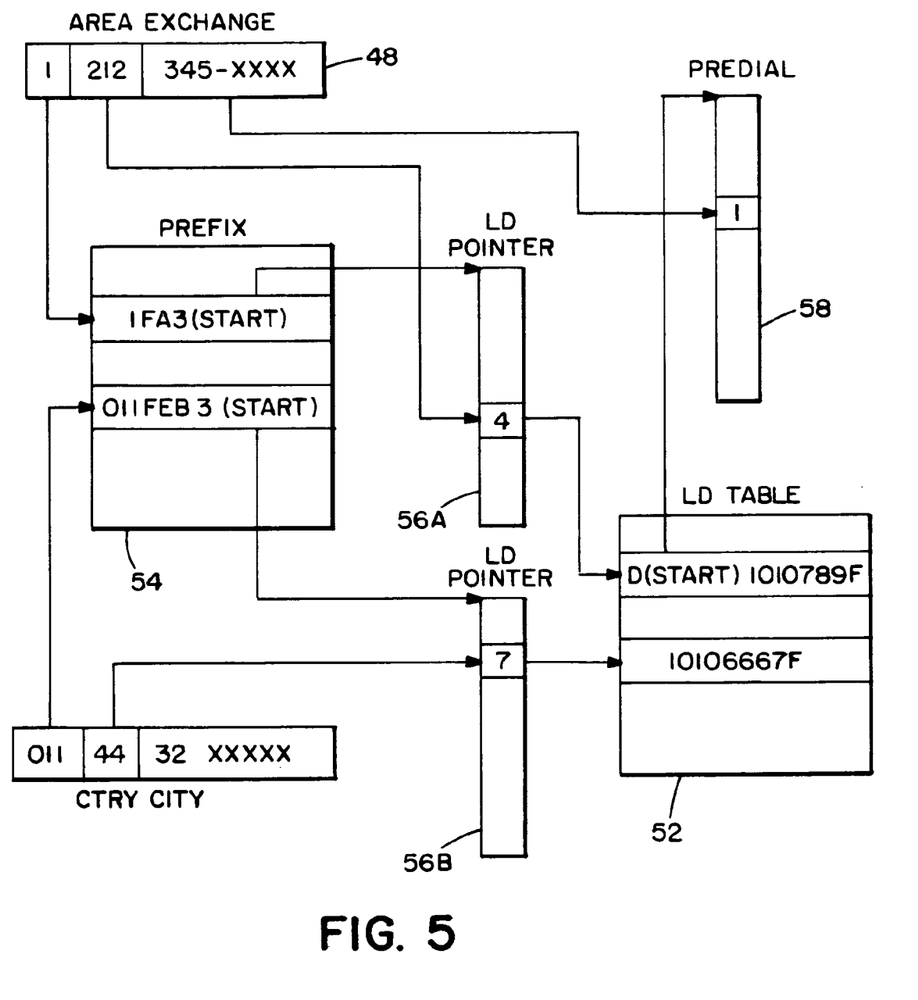
FIG. 5 illustrates in greater detail an example use of the tables of FIG. 3.

Illustration of the use of the tables in response to two phone numbers is presented in FIG. 5. In response to the phone number 1 212 345-xxxx at the top of the figure, the prefix 1 is used to search the prefix table to locate the entry 1F. The processor then reads that entry and from the hexadecimal digit A recognizes that 10 digits are to be expected after the prefix 1. A TD digit 3 indicates that a start address which follows the 3 points to a 1000 nibble LD pointer table. It also indicates that the next three digits 212 of the dialed telephone number provide the offset to address the pointer table 56A. Within the LD pointer table identified by the start address in the prefix entry, at the offset of 212, an entry 4 is read. That entry points to one of the 15 entries of the LD table associated with the most appropriate carrier for the dialed number, and the LD table entry includes an appropriate dialing sequence for that carrier.

A typical entry is 10106667F where F indicates the end of the number. A longer entry could be a 7-digit number, a "detect computer tone" symbol C typically followed by a nibble that gives information, followed by a billing code. The nibble that gives information mentioned in the prior sentence could state, for instance, the kind of computer tone and whether the long-distance number should be dialed after or before the billing code that follows.

The area code may not be sufficient to determine whether the selected carrier should in fact be used. Depending on the local exchange, it may be better to pass through the originally dialed number. For example, a call which is local may not be appropriate for a long distance carrier. To that end, each entry in the LD table may include a character D if an additional check is to be made based on the local exchange. Where the character D is included, the following 3 digits indicate a start address of a 1000 bit predial bit map table 58. The local exchange is then used to access that bit map to determine whether the entry in the LD table should be used or whether the originally dialed number should be passed through.

In this first example, the character D indicates that a predial bit map which begins at the following start address must be checked. The three digits of the dialed number following the sequence used to access the LD pointer table are used as an offset into the predial bit map. In this case, the bit at that entry is 1 so the remaining digits in the LD table entry 1010789 replace the prefix 1 of the original number in the final dialing sequence. If the entry in the bit map had been 0, the originally dialed sequence would be passed through as the final sequence.

The second example of a dialed number presented to the lower left of FIG. 5 is for an international call. The prefix 011 matches the entry 011F in the prefix table as indicated. The DTD digit E followed by the digit B indicates that the processor should wait until at least hexadecimal B=11 more digits are received and then proceed with the dialing sequence if two seconds elapse without further input dialing. A TD character 3 indicates that the three digits after the 011 prefix are to be used to access a 1000-nibble LD pointer table starting at the start address indicated in the prefix table entry.

As illustrated, the start address in the prefix table entry points to an LD pointer table 56B. Further, in accordance with the TD=3 command of the prefix table entry, the following three digits of the original telephone number are used as an offset to the table 56B to select an entry 7. The entry 7 points to the seventh long distance carrier entry of the LD table 52. In the LD table 52, no D character is included in the entry so the full sequence presented in the LD table entry replaces the 011 prefix of the original dial sequence.

Figure 6:
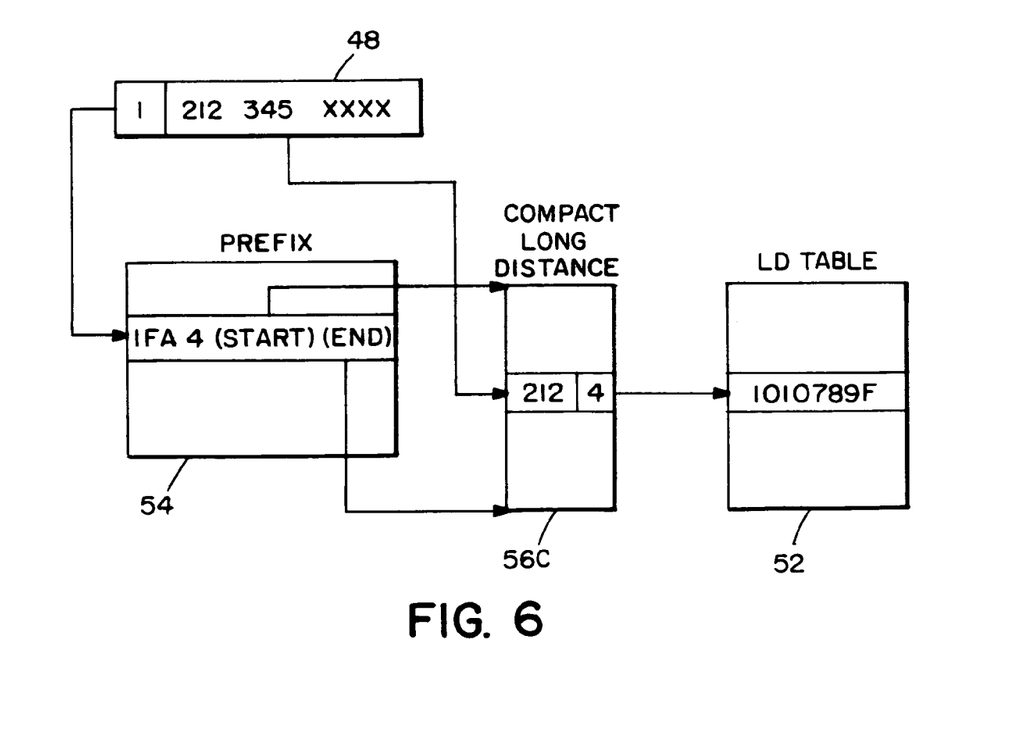
FIG. 6 illustrates the alternative use of a compact long distance table in the system of FIG. 3.

FIG. 6 illustrates use of the TD=4 code. In this example, the TD code 4 in the prefix table entry indicates that a compact long distance (CLD) table is to be referenced to identify the appropriate carrier. In particular, the next three digits of the dialed number are to be compared to entries in a CLD table. That CLD table begins at the start address and ends at the end address identified in the prefix table entry. The located entry in the CLD table points to an entry for a carrier in the LD table 52.

Figure 7:
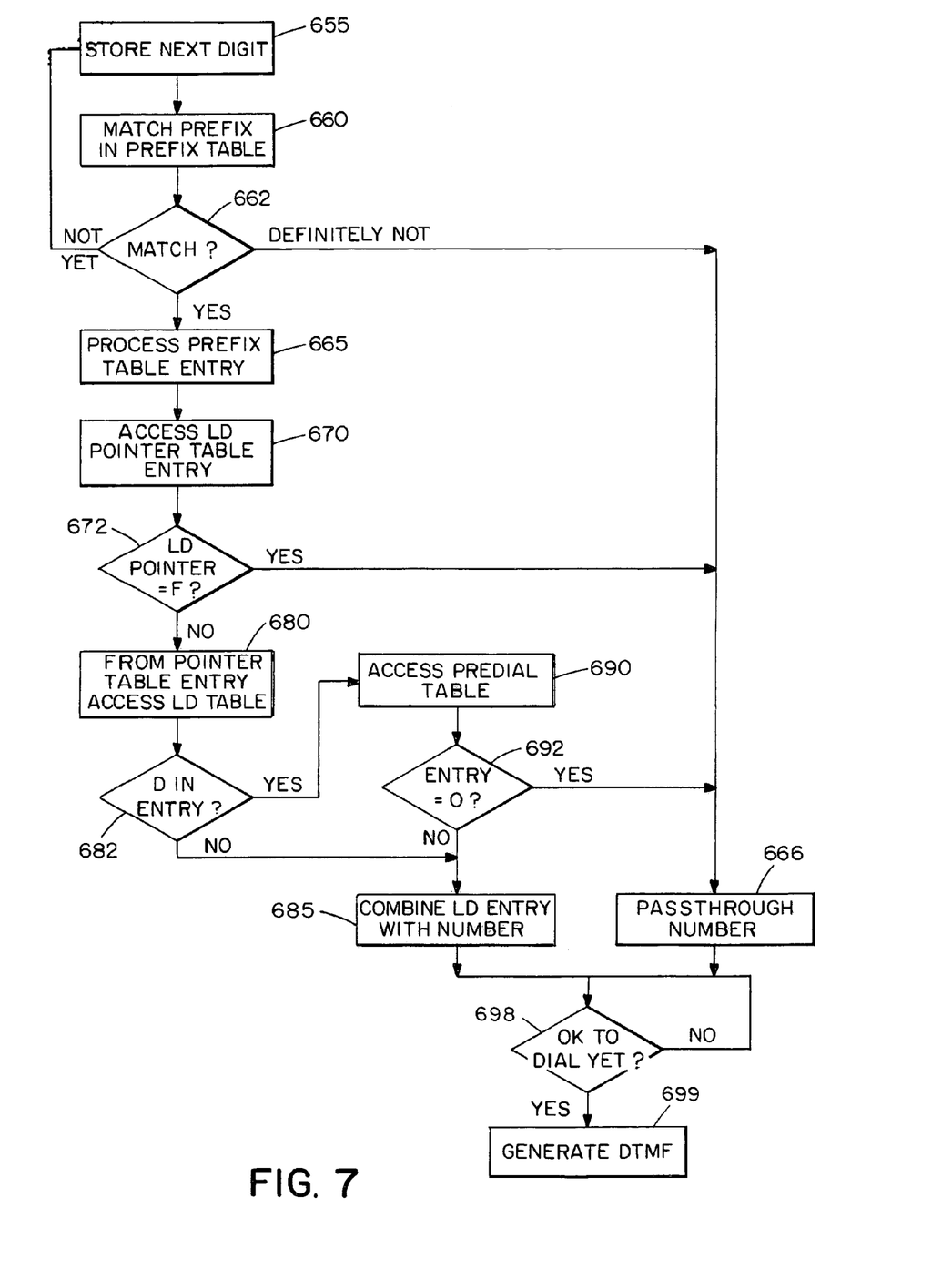
FIG. 7 presents a flow chart for use of the tables of FIG. 3.

A flow chart of the basic overall operation of the dialer is provided in FIG. 7. Referring again to FIG. 6, consider that a user dials the digits "1-212-345-xxxx" on a telephone set that is connected to the dialer. The microprocessor 42 receives the dialed telephone number and stores the first digit in a temporary memory location (Step 655). A software program running on microprocessor 42 retrieves the prefix "1" from that memory location and compares it with the prefixes stored in the prefix table (Step 660). When a matching prefix is detected at 662, the information stored in the corresponding prefix table entry is processed (Step 665). If a complete match has not been found but additional digits may provide a match, the system retrieves and stores another digit at step 655. If there can be no match with the stored digits, the dialed number is passed through at step 666.

Assuming that the entry contains the value "1FA30160", the hexadecimal number "A" indicates that the modified or unmodified telephone number will be forwarded to the central office when ten digits are dialed after the prefix. Also, the next value 3 indicates that the three digits ("212") after the prefix are used to access a one thousand nibble LD pointer table 56A starting at address 0160. Therefore, the microprocessor adds the three digit value 212 to the start address of the LD pointer table to generate the address of a particular LD pointer table entry and access that entry at step 670. If the LD pointer is F at 672, the original number is passed through at step 666.

When the microprocessor accesses the LD pointer table entry, it retrieves an offset address, such as A, into the LD table 52. The microprocessor 42 adds the offset address to the base address of the LD table and accesses the associated LD table entry (Step 680). Where that entry includes a value that does not start with a D (step 682), microprocessor 42 retrieves the value and prepends it to the dialed digits (Step 685).

Alternatively, where the LD table entry includes a value beginning with a D, the microprocessor accesses the predial bitmap table before proceeding with the modification of the dialed telephone number (Step 690). Microprocessor 42 accesses the predial bitmap table using the digits "345", i.e. the digits that follow the digits used to access the LD table 52. If at step 692 the value in the predial bitmap table entry is a 0, then no further processing will be performed and the digits dialed by the user will be passed through (Step 666). In other words, the value stored in the LD table entry will be ignored. If the value in the predial bitmap table entry is 1, the value in the LD table entry (except the initial D and bitmap address) will be prepended to the dialed digits (Step 685).

After Step 685 or Step 666, the system determines at 698 whether the time is appropriate for forwarding the passed through or modified phone number to the central office via the tone/signal generator 46 (Step 699). The appropriate time may be immediate, or it may require waiting for a certain number of digits to be dialed or a time to elapse without dialing or both.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining a dialing sequence by a telephone dialer to be appended to a telephone number, comprising the steps of:

using a variable length prefix portion of the telephone number to access a prefix table entry that defines an action descriptor for indicating how the telephone number should be processed in a table lookup to determine a dialing sequence;

dependent on the defined action descriptor, using another portion of the telephone number to access another table to determine a dialing sequence; and generating a dialing sequence based on the telephone number and the other table entry.

2. A method as claimed in claim 1 wherein prefix portions are definable to include variable digits.

3. A method as claimed in claim 2 wherein each prefix is separated from an action descriptor by a punctuation code.

4. A method as clamed in claim 1 wherein an action descriptor includes a specification of a minimum number of digits to be dialed to trigger a dialing action.

5. A method as claimed in claim 4 further comprising in the action descriptor an indication of an elapsed time to trigger dialing.

6. A method as claimed in claim 1 wherein a prefix may include an indication of elapsed time to indicate completion of a prefix.

7. A method as claimed in claim 1 wherein an action descriptor includes an indication of a number of digits after the prefix used to determine an action.

8. A method as claimed in claim 7 wherein the action descriptor specifies one of plural ways in which digits after the prefix are used to determine an action.

9. A method as claimed in claim 8 wherein the digits after the prefix address a table which identifies a dialing action.

10. A method as claimed in claim 9 wherein the action descriptor further includes a table identifier.

11. A method as claimed in claim 8 wherein the digits after the prefix may be matched with an entry in a table to identify a dialing action.

12. A method as claimed in claim 11 wherein the action descriptor further includes a table identifier.

13. A method as claimed in claim 8 wherein the action descriptor further includes a table identifier.

14. A method as claimed in claim 8 wherein an action descriptor includes an indication of a number of digits after the prefix used to determine an action.

15. A method as claimed in claim 7 wherein an action descriptor includes a specification of the number of digits to be dialed to trigger a dialing action.

16. A method as claimed in claim 1 wherein a portion of the telephone number identifies an entry in a pointer tables the entry in the pointer table pointing to a long distance table entry with dialing details.

17. A method as claimed in claim 16 wherein an entry in the long distance table includes a predial code to determine from additional digits of the telephone number whether the dialing sequence of the long distance table is used or the telephone number is passed through.

18. A method as claimed in claim 17 wherein the predial code causes an extension of the telephone number to address a predial table.

19. A method as claimed in claim 16 wherein a dialing sequence included in the long distance table is prepended to a portion of the telephone number.

20. A method as claimed in claim 1 wherein an extension of the telephone number is applied to a table to determine a dialing action.

21. A method as claimed in claim 20 wherein the extension determines whether the original telephone number is passed through.

22. A method for determining a long distance carrier code to be coupled to a dialed telephone number, as described in claim 1, further comprising the steps of:

retrieving information from the prefix table entry that indicates a number of digits of the dialed telephone number to be used to search a long distance pointer table;

retrieving a starting location of a long distance pointer table from the prefix table entry;

searching the long distance pointer table to determine a pointer to a long distance carrier; and accessing a long distance carrier code from a long distance table using the long distance carrier pointer.

23. A method as claimed in claim 1 further comprising reprogramming tables which define the prefix table entries and action descriptors.

24. A method as claimed in claim 23 wherein the tables are reprogrammed through DTMF signals from a remote computer.

25. A method as claimed in claim 23 wherein the tables are reprogrammed through a modem connection to a remote computer.

26. A telephone dialer comprising:

a prefix table that associates an action descriptor with a variable length prefix portion, the action descriptor indicating how a telephone number should be processed in a table lookup to determine a dialing sequence; and another table accessed by another portion of the telephone number as a function of the associated action descriptor to determine a dialing sequence; and a dialing sequence generator which generates a dialing sequence based on the telephone number and an entry in the other table.

27. A telephone dialer as claimed in claim 26 wherein prefix portions are definable to include variable digits.

28. A telephone dialer as claimed in claim 26 wherein each prefix is separated from an action descriptor by a punctuation code.

29. A telephone dialer as claimed in claim 26 wherein an action descriptor includes a specification of the number of digits to be dialed to trigger a dialing action.

30. A telephone dialer as claimed in claim 29 further comprising in the action descriptor an indication of an elapsed time to trigger dialing.

31. A telephone dialer as claimed in claim 26 wherein a prefix may include an indication of elapsed time to indicate completion of a prefix.

32. A telephone dialer as claimed in claim 26 wherein an action descriptor includes an indication of a number of digits after the prefix used to determine an action.

33. A telephone dialer as claimed in claim 32 wherein the action descriptor specifies one of plural ways in which digits after the prefix are used to determine an action.

34. A telephone dialer as claimed in claim 33 wherein the digits after the prefix address a table which identifies a dialing action.

35. A telephone dialer as claimed in claim 34 wherein the action descriptor further includes a table identifier.

36. A telephone dialer as claimed in claim 33 wherein the digits after the prefix may be matched with an entry in a table to identify a dialing action.

37. A telephone dialer as claimed in claim 36 wherein the action descriptor further includes a table identifier.

38. A telephone dialer as claimed in claim 33 wherein the action descriptor further includes a table identifier.

39. A telephone dialer as claimed in claim 33 wherein an action descriptor includes an indication of a number of digits after the prefix used to determine an action.

40. A telephone dialer as claimed in claim 32 wherein an action descriptor includes a specification of the number of digits to be dialed to trigger a dialing action.

41. A telephone dialer as claimed in claim 26 wherein a portion of the telephone number identifies an entry in a pointer table, the entry in the pointer table pointing to a long distance table entry with dialing details.

42. A telephone dialer as claimed in claim 41 wherein an entry in the long distance table includes a predial code to determine from additional digits of the telephone number whether the dialing sequence of the long distance table is used or the telephone number is passed through.

43. A telephone dialer as claimed in claim 42 wherein the predial code causes an extension of the telephone number to address a predial table.

44. A telephone dialer as claimed in claim 41 wherein a dialing sequence included in the long distance table is prepended to a portion of the telephone number.

45. A telephone dialer as claimed in claim 26 wherein an extension of the telephone number is applied to a table to determine whether the original telephone number is passed through.

46. A telephone dialer as claimed in claim 26 further comprising:
   a long distance pointer table, the prefix table entry indicating a number of digits of the dialed telephone number to be used to search the long distance pointer table and including a starting address of the long distance pointer table; and
   a long distance table having long distance carrier code entries, the long distance pointer table entries including pointers to the long distance table.

47. A telephone dialer as claimed in claim 26 wherein the tables are programmable to define the prefix table entries and action descriptors.

48. A telephone dialer as claimed in claim 47 wherein the tables are reprogrammed through DTMF signals from a remote computer.

49. A telephone dialer as claimed in claim 47 wherein the tables are reprogrammed through a modem connection to a remote computer.

50. A telephone dialer for determining a dialing sequence to a telephone number comprising:
   prefix table means for receiving a variable length prefix portion of a telephone number and defining an action descriptor for indicating how the telephone number should be processed in a table lookup to determine the dialing sequence;
   other table means for using another portion of the telephone number to access another table as a function of the action descriptor to determine a dialing sequence; and
   dialing sequence generating means for dialing a sequence based on the telephone number and the prefix other table entry.

* * * * *

UNITED STATES PATENT AND TRADEMARK OFFICE
CERTIFICATE OF CORRECTION

PATENT NO. : 6,963,640 B1
DATED : November 8, 2005
INVENTOR(S) : Frank B. Manning It is certified that error appears in the above-identified patent and that said Letters Patent is hereby corrected as shown below:

Column 9,
Line 48, delete "tables" and insert -- table, --.

Column 10,
Line 28, delete "and".

Column 12,
Line 29, delete "prefix".

Signed and Sealed this

Seventeenth Day of January, 2006

JON W. DUDAS
*Director of the United States Patent and Trademark Office*